April 14, 1931. H. S. POWELL 1,800,355
CUSHION JOINT FOR THE SPRINGS OF AUTOMOBILES
Filed March 9, 1929
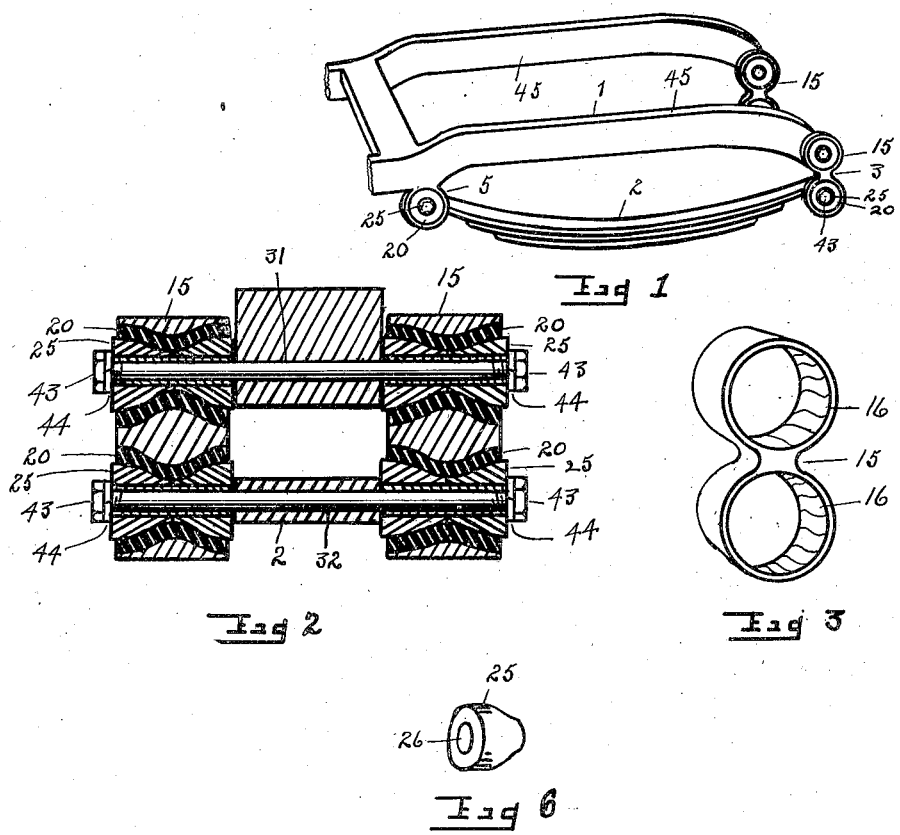
Inventor
Herbert S. Powell
By Thomas L. Wilder
Attorney Patented Apr. 14, 1931

1,800,355

UNITED STATES PATENT OFFICE

HERBERT S. POWELL, OF UTICA, NEW YORK

CUSHION JOINT FOR THE SPRINGS OF AUTOMOBILES

Application filed March 9, 1929. Serial No. 345,812.

My invention relates to a cushion joint for the springs of automobiles, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a cushion joint for the springs of automobiles, whereby to eliminate the use of oil or grease heretofore used in connection with such joints. To this end the shackle bolts are supported by hangers that carry rubber bushings, through the center of which said bolts are projected. Furthermore, the rubber bushings will not only eliminate the use of oil or grease at such parts but will also improve the riding qualities of the springs.

The object will be understood by referring to the drawings, in which:

Fig. 1 is a perspective view of a chassis of an automobile showing the same broken away and the cushion joint applied thereto.

Fig. 2 is a detail view somewhat enlarged showing a central vertical section of the shackle having the cushion joint therein.

Fig. 3 is a detail perspective view somewhat enlarged, of one of the members of the cushion joint.

Fig. 4 is a central vertical section of a member of the cushion joint showing a slight modification, parts being broken away.

Fig. 5 is a detail view showing a central vertical section of a member of a cushion joint illustrating the manner of compressing the rubber in said joint for the assembling of the working parts, parts being broken away.

Fig. 6 is a detail perspective view of a member employed.

Fig. 7 is a detail perspective view of the modified form of tube shown in Fig. 4.

Referring more particularly to the drawings, a chassis of an automobile is represented by 1. The rear ends of both the front and rear leaf springs 2 are attached to said chassis by independent shackles 3, 3 and the front ends by shackles 5, 5 made integral with chassis 1.

Inasmuch as shackles 3, 3 and 5, 5 are made substantially alike the detail structure of one only will suffice. Said shackles comprise hangers 15, 15. Each of these is equipped with two annular recesses 16, 16 provided with irregular surfaces that form a compound or S-shaped curve with the thicker wall in the center of said hanger, whereby the narrower part of the annular recess will be in the center. This irregular or bow shaped surface will tend to cause the weight of the automobile to be carried at the center of hangers 15, 15. A rubber bushing 20 is inserted in each of said recesses 16, 16 and forced or compressed against the inner surface of the hanger in each of said recesses 16, 16 whereby to hold said rubber bushings 20 in place and to prevent them from moving or creeping longitudinally with respect to the surface of hanger 15 within recesses 16, 16.

The means for forcing said rubber bushings 20, 20 into close adhesion with the interior surface of each of the hangers 15 adjacent recesses 16, 16 embodies the wedge shaped thimbles or members 25, 25 that are provided in each instance with an open central recess 26 for the projection of a sleeve 27. The outer surface of each of the members 25 conforms in shape to a portion of the inner surface of the hangers 15 adjacent recesses 16, whereby when assembled to cooperate with said inner surface in holding the rubber bushing in place. Two of these members 25 are employed in each recess 16 of hanger 15. They are mounted on sleeve 27 and forced towards each other until their inner ends meet in the center of the recess 16. In this latter position their outer or end surfaces will project slightly beyond the adjacent lateral surfaces of hanger 15. Said hollow sleeve 27 is projected through the central recesses of members 25 and in turn its surface forms a bearing for one of the shackle bolts 31 and 32. In practice one of the members 25 will be slipped on hollow sleeve 27, and pushed into the recess 42 of rubber bushing 20 which has been disposed already in recess 16 of hanger 15 and then the other member 25 will be pushed onto sleeve 27 from the opposite side into assembled position. The outer surface of each of the members 25 is covered with cement to aid in the adhesion of the rubber bushing 20 thereto, whereby to further help in holding said rubber bushing 20 in place.

Two of the hangers 15 cooperate with each other to form a joint, and are disposed on opposite sides of the side bars 45 of chassis 1 through which upper bolt 31 projects to unite the shackle to said chassis 1. The lower shackle bolt 32 forms a bearing about which the end of leaf spring 2 is wound.

Rubber bushing 20 is made to occupy most of the space within the recess 16. It has a comparatively small central open recess through which hollow sleeve 27 is projected by the aid of the pilot 40. Pilot 40 is conical in shape with a rather small annular end 41 adapted to enter the central recess 42 of rubber bushing 20. The rubber is forced outward against the inner surface of hanger 15 in recess 16 and spread longitudinally to occupy all of the space therein by the tapering surface of pilot 40 which enlarges said recess 42 as it is pushed therein, whereby to make room for sleeve 27. Moreover, pilot 40 is reduced at $45^1$ to form a shoulder and a cylindrical part 46 over which part 46 sleeve 27 is projected when forcing said sleeve 27 into recess 42 of rubber bushing 20 by aid of pilot 40. Pilot 40 is removed after sleeve 27 has been pushed into assembled position.

Shackle bolts 31 and 32 are threaded at each end for mounting nuts 43, whereby to hold the shackle in rigid position. To this end lock or expanding springs 44 are mounted on shackle bolts 31 and 32 adjacent the ends, whereby to hold the nuts in given position.

Fig. 4 shows a modification of sleeve 27 which has annular ribs 50 formed or pushed outward in its surface to aid in holding members 25 thereto. Annular ribs 50 will yield sufficiently to allow members 25 to be pushed thereover into their proper place on sleeve 27.

Having thus described my invention what I claim as new and desire to secure by Letters Patent is as follows:

1. In a cushion joint for the springs of automobiles, a member having a recess for the projection of the shackle bolt, a yielding cushion for holding said bolt in position and an irregular shaped surface on said member within said recess and means for compressing said cushion from the center outwardly, whereby to prevent said yielding cushion from moving with respect to said member.

2. In a cushion joint for the springs of automobiles having a shackle bolt, a member having a recess for supporting said shackle bolt, a cushion member within the said recess, said cushion member being coated with an adhesive substance whereby to aid in holding said cushion member to said first named member, and wedge shaped members for holding said cushion member in said first named member.

3. In a cushion joint for the springs of automobiles having a shackle bolt, a member having a recess for supporting said shackle bolt, a cushion member within said recess, and surrounding said shackle bolt, wedge shaped members for holding said cushion member in place and friction means for holding said wedge shaped members in position.

4. In a cushion joint for the springs of automobiles having a shackle bolt, a member having a recess for supporting said shackle bolt an elongated cushion member disposed in said recess, and wedge shaped bearings conforming to the shape of the recess in said member, and friction means for holding said wedge shaped bearings in position.

In testimony whereof I have affixed my signature.

HERBERT S. POWELL.